(12) United States Patent
Merkin

(10) Patent No.: US 6,567,272 B1
(45) Date of Patent: May 20, 2003

(54) SYSTEM AND METHOD FOR UTILIZING SYSTEM CONFIGURATIONS IN A MODULAR COMPUTER SYSTEM

(75) Inventor: Cynthia M. Merkin, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 13 days.

(21) Appl. No.: 10/008,099

(22) Filed: Nov. 9, 2001

(51) Int. Cl.[7] .................................................. H05K 5/00
(52) U.S. Cl. .................. 361/724; 364/708.1; 312/223.1; 439/155
(58) Field of Search ................................ 361/724–727, 361/683–687; 364/708.1; 312/223.1, 223.2, 265.2; 439/155–160; 710/103

(56) References Cited

U.S. PATENT DOCUMENTS

| | | | |
|---|---|---|---|
| 4,736,116 A | 4/1988 | Pavlak, Jr. et al. | 307/41 |
| 4,992,970 A | 2/1991 | Igarashi | 364/900 |
| 5,450,073 A | 9/1995 | Brown et al. | 340/825.07 |
| 5,550,729 A | 8/1996 | Wissell | 363/65 |
| 5,822,184 A * | 10/1998 | Rabinovitz | 361/685 |
| 5,959,841 A * | 9/1999 | Allen et al. | 361/725 |
| 6,085,030 A | 7/2000 | Whitehead et al. | 395/200.33 |
| 6,134,614 A | 10/2000 | Chari et al. | 710/103 |
| 6,212,585 B1 | 4/2001 | Chrabaszcz | 710/103 |
| 6,237,103 B1 | 5/2001 | Lam et al. | 713/330 |
| 6,260,155 B1 | 7/2001 | Dellacona | 714/4 |
| 6,263,387 B1 | 7/2001 | Chrabaszcz | 710/103 |
| 6,317,316 B1 | 11/2001 | Bentley et al. | 361/681 |
| 6,324,062 B1 * | 11/2001 | Treiber et al. | 361/727 |
| 6,459,589 B2 * | 10/2002 | Manweiler et al. | 361/752 |

FOREIGN PATENT DOCUMENTS

| | | | |
|---|---|---|---|
| EP | 0430671 | 6/1991 | G06F/1/26 |
| GB | 2122776 | 1/1984 | G05F/1/10 |
| WO | WO0072167 | 11/2000 | G06F/15/16 |
| WO | WO0114962 | 3/2001 | G06F/9/44 |

* cited by examiner

*Primary Examiner*—Darren Schuberg
*Assistant Examiner*—Hung Van Duong
(74) *Attorney, Agent, or Firm*—Baker Botts L.L.P.

(57) ABSTRACT

A system and method are provided for utilizing system configurations in a modular computer system. The system and method includes one or more modular components and a midplane operable to receive a modular component configuration. One or more system configurations determine how the modular components interoperate with each other. A management module determines if the modular component configuration satisfies a selected system configuration and provides an indication of whether the modular component configuration satisfies one or more requirements of the selected system configuration. When the modular component configuration does not satisfy the requirements of the selected system configuration, the management module provides a configuration warning alerting a user to a configuration problem with the modular component configuration. The configuration warning allows the user to know that a modular component configuration problem and not a modular component hardware malfunction is causing an error within the modular computer system.

21 Claims, 4 Drawing Sheets

SYSTEM AND METHOD FOR UTILIZING SYSTEM CONFIGURATIONS IN A MODULAR COMPUTER SYSTEM

TECHNICAL FIELD

This disclosure relates in general to the field of computer system configurations, and more particularly to a system and method for utilizing system configurations in a modular computer system.

BACKGROUND

As computer processing needs continue to grow and encompass more tasks, users look for powerful computer systems that also provide greater functionality and customization. One way that users increase the functionality of their computer systems is by adding components that may provide either increased functionality or additional functionality. With standard monolithic computer systems, the user knows the exact contents of the monolithic system and when a user installs a component into the computer system chassis or enclosure, the user has a notion of how the component will interoperate with other components in the computer system since typically the components interact in one way within a monolithic computer system. Therefore, adding a component to a monolithic computer system and configuring the component to interact with other components already present is generally not a difficult task.

As users and companies strive for computer systems occupying less space but having increased computing power and customization, users are moving away from monolithic systems and towards modular computer systems. Modular computer systems allow users to create custom computer systems that satisfy the very specific requirements of each user. Modular computer systems are made up of one or more modular components such as processing components, input/output components, power supply components, and data components that can be connected together in any combination and number within a chassis. Since each modular component performs specific functions, users are able to combine the modular components to create a modular computer system that best fits the users' needs. Because modular components may be configured to form one or multiple systems, modular component interoperability is not known until the chassis is instructed what do with the modular components. After the user alters the modular component configuration, the computer system prompts the user to identify how the modular components are to interoperate. Therefore, the user must know how the modular components are supposed to interact with each other when adding, removing, or replacing modular components.

A difficulty with installing or removing modular components in a modular computer system is that the user must identify how the modular components will interoperate after the user has installed, replaced, or removed a modular component. The user performs the work of altering a modular component configuration without knowing if the modular computer system supports the new modular component configuration or if the new configuration will function as the user expects. For instance, a user may configure the modular components in a manner that the modular computer system does not currently support and cannot be modified to support. Therefore, the user wastes time creating a configuration that cannot be supported by the computer system and results in a computer system that does not adequately meet the needs of the user.

Problems may occur after the user has altered the modular component configuration, attempted to power the modular computer system, and identified how the modular components are to interact with each other. If the user incorrectly installs or removes the additional modular component or incorrectly identifies how the modular components are to interact with each other, the computer system may not power up correctly or function as the user expects. If the computer system does not power up or function correctly, the user often has no idea if there is a faulty modular component causing the error or if the error is due to a configuration problem because the user did not correctly identify how the modular components interact with each other. This lack of knowledge also makes servicing, both on-site and remote, difficult because the service technician has to investigate potential sources of error in both the modular components and the system before being able to diagnose the problem and offer a solution.

SUMMARY

Therefore, a need has arisen for a system and method that allows for determining how modular components within a modular computer system interoperate before the installation, replacement, or removal of a modular component.

A further need has arisen for a system and method that allows for the determination of whether an error in a modular computer system is due to a faulty modular component or an incorrect configuration for the system.

In accordance with teachings of the present disclosure, a system and method are described for utilizing system configurations in a modular computer system which substantially eliminate or reduce disadvantages and problems associated with previous modular computer systems. The system and method allow system configurations to be set into a modular computer system to indicate how one or more modular components will interoperate before altering the modular component configuration.

In accordance with one aspect of the present disclosure, a system and method provides one or more system configurations for a modular computer system having one or more modular components. The computer system may also include a midplane operable to receive the modular components. The system configurations determine how the modular components interoperate. A management module, associated with the system configurations, determines if the modular component configuration satisfies the selected system configuration and gives an indication of whether the modular component configuration satisfies the selected system configuration.

In one embodiment, a user of the modular computer system selects a system configuration that corresponds to a desired modular component configuration. If there are not any system configurations that correspond with the desired modular component configuration, the user has the option to create a new system configurations that does correspond with the user's desired modular component configuration. The user creates a modular component configuration by either installing, replacing, or removing one or more modular components or by altering the modular components currently installed. Once the modular component configuration is completed, the management module determines if the modular component configuration satisfies the requirements of the selected system configuration and provides an indication regarding whether the modular component configuration satisfies the selected system configuration. If the modular component configuration satisfies the selected system configuration, then the modular computer system will power up and be ready for use by the user. If the modular component configuration does not satisfy the selected system configuration, the management module provides a configuration warning indicating that the modular component configuration does not satisfy the selected system configuration.

The present disclosure provides a number of important technical advantages. One important technical advantage is the ability to determine how the modular components interoperate before installing, replacing, or removing any of the modular components. Being able to decide how modular components interoperate before changing the modular component configuration allows the user to not waste time creating a modular component configuration that is not supported or cannot be supported by the modular computer system. The user does not have to wait until after a modular component is installed to determine how the modular component interacts with other modular components because the user determines how the modular components interact when the user selects a particular system configuration.

Another important technical advantage of the present disclosure is the ability to determine whether an error in a modular computer system is due to a faulty modular component or an incorrect modular component configuration. Typically when a user installs a new modular component and the computer system does not function correctly, the user does not know if the modular component is faulty or if the modular components are installed or configured incorrectly. The configuration warning given by the management module alerts the user that there is a configuration problem and not a hardware problem with the additional modular component. The user can provide the configuration warning to an on-site or remote service technician to aid the service technician in diagnosing and solving the problem. In addition, by selecting a system configuration before creating a modular component configuration, the user defines the behavior and operation of one or more modular components which the user may also relay to the service technician to further aid in the servicing of the modular computer system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

With monolithic computer systems, when a user installs a new component within the computer system, the user generally has an idea as to how the new component will interact with the other components. But in modular computer systems, how modular components will interoperate within the modular computer system is often not known until after the user creates the modular component configuration and the modular computer system identifies the modular components and prompts the user to identify how the modular components are to interact with each other. The system configurations of the present disclosure allow a user to determine how the modular components will interoperate with each other before the user alters the current modular component configuration.

Figure 1:
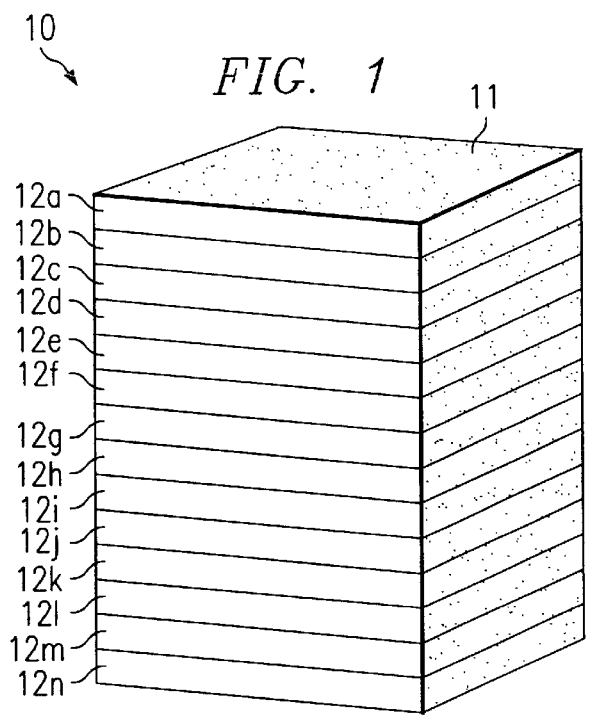
FIG. 1 is a schematic representation of a modular computer system.

FIG. 1 is a schematic representation of modular computer system 10 enclosed within cabinet 11. Cabinet 11 accepts one or more chassis 12 where chassis 12 receive one or more modular components. Cabinet 11 may be a typical U-sized server rack cabinet (a U is a standard unit of measure for designating the height in computer enclosures and rack cabinets where 1U equals 1.75 inches). In the embodiment shown in FIG. 1, cabinet 11 may be a 42U server rack cabinet meaning that it can accommodate forty-two conventional 1U monolithic computer systems or any combination of conventional 1U, 2U, 4U, and 7U monolithic computer systems equaling 42U.

Cabinet 11 accepts modular components instead of monolithic computer systems. Therefore, cabinet 11 receives one or more chassis 12 where chassis 12 house the modular components. In the embodiment shown in FIG. 1, there are fourteen chassis 12a–12n where each chassis 12 is 3U high. In other embodiments there may be more or less than fourteen chassis 12 in cabinet 11 and chassis 12 may be greater than or less than 3U in height.

Figure 2:
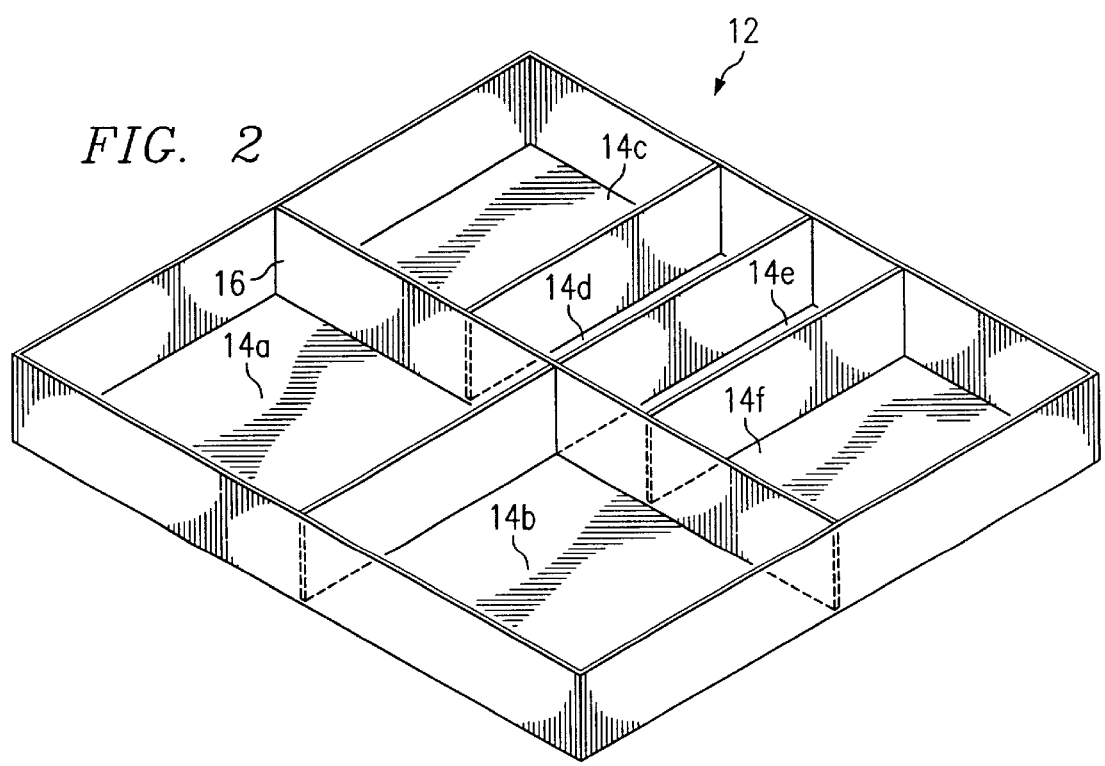
FIG. 2 depicts a typical chassis for modular components.

Shown in FIG. 2 is an example of chassis 12 removed from cabinet 11. Chassis 12 includes one or more quadrants 14 where quadrants 14 are operable to accept modular components such as server bricks and server blades where such modular components include processing components, input/output ("I/O") components, data components, power supply components, or any other suitable types of modular computer components. Chassis 12 is shown in FIG. 2 with six quadrants 14a–14f allowing chassis 12 to accept up to six modular components. Because chassis 12 are multi-configurable to accept a wide variety of modular components types and numbers, in alternate embodiments chassis 12 may include more or less than six quadrants 14 and quadrants 14 may be arranged differently within chassis 12. Chassis 12 may include midplane 16 which includes hardware connectors (not expressly shown) that allows associated modular components to connect to midplane 16 and interface with each other within chassis 12.

Figure 3A:
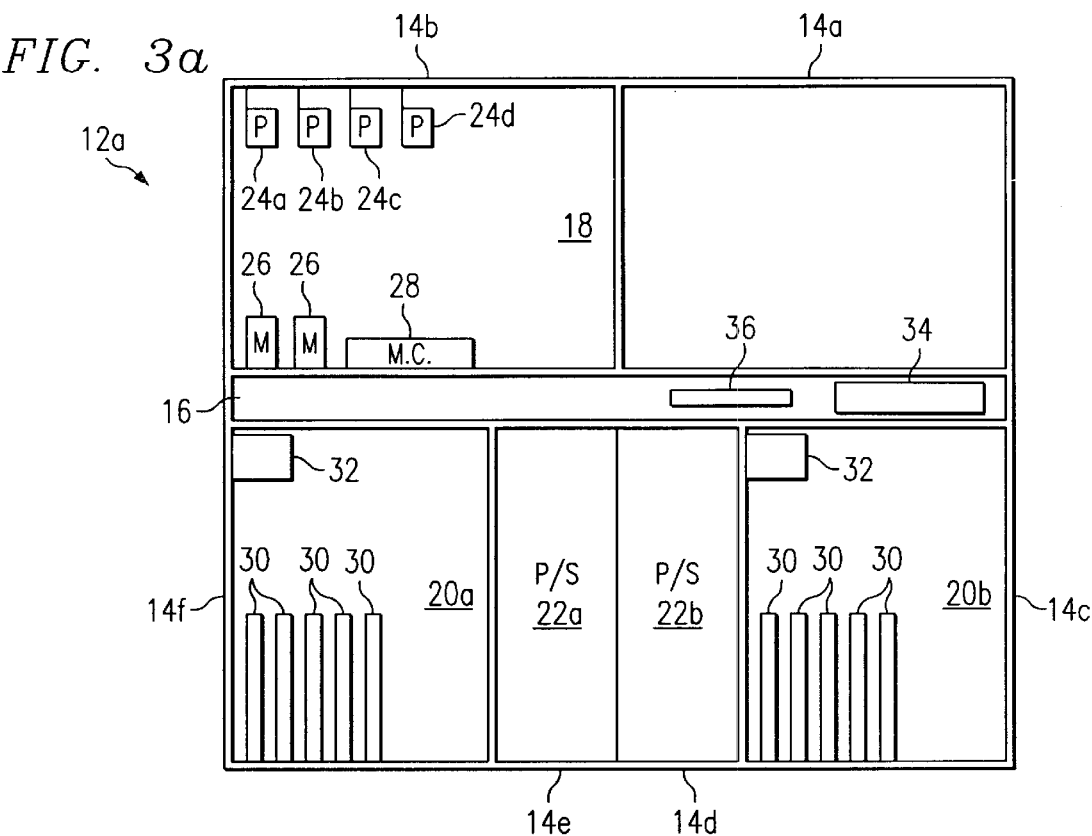
FIGS. 3a, 3b, 3c, and 3d illustrate block diagrams of various modular component configurations.

FIG. 3a illustrates a block diagram of chassis 12a including midplane 16 and the following modular components organized in a particular modular component configuration: processing component 18, two input/output ("I/O") components 20a and 20b, and two power supply components 22a and 22b. The modular component configuration is how the modular components are arranged within chassis 12. The modular component configuration for chassis 12a is processing component 18 in quadrant 14b, I/O component 20a in quadrant 14f, I/O component 20b in quadrant 14c, power supply component 22a in quadrant 14e, and power supply component 22b in quadrant 14d while quadrant 14a remains empty. Processing component 18 includes four processors 24a–24d (such as processors available through Intel and Advanced Micro Devices), local memory 26, memory controller 28, and various connectors to allow for communication between processing component 18, midplane 16, and other modular components. In alternative embodiments, processing component 18 may contain more or less than four processors 24. I/O components 20a and 20b include five hot-pluggable PCI bus slots, a fibre channel system disk 32, and any other suitable input/output ports such as Ethernet ports, IEEE-1394 ports or USB ports. In alternate embodiments, I/O components 20a and 20b may include only PCI slots or any other appropriate input/output connections. Power supply components 22a and 22b may include one or more power supplies providing power to the modular components as well as redundancy features.

Midplane 16 preferably includes management module 34 and storage medium 36. Storage medium 36 may be non-volatile memory such as EEPROM or SEPROM and is where management module 34 stores and accesses the system configurations for chassis 12a. The system configurations identify, determine, and control how processing component 18, I/O components 20a and 20b, and power supply components 22a and 22b interact with each other within chassis 12a. Management module 34 has knowledge of the different types of modular components and understands which modular components are supported by chassis 12a and the system configurations. Each of the modular components includes a description of the type of modular component they are and management module 34 reads this description to recognize the modular components and know where the modular components are located within chassis 12a. The description within each modular component also allows management module 34 to relate the system configuration to how the modular components interoperate.

When the manufacturer of chassis 12a designs and builds chassis 12a, the manufacturer may create one or more system configurations and store the system configurations in storage medium 36. The system configurations are created and stored in storage medium 36 before the manufacturer ships chassis 12a to the user. The users may create and store additional system configurations in storage medium 36 by accessing and using management module 34 to create additional system configurations that specifically fit the needs of the users.

The system configurations may include a variety of different modular component configurations. For example, one system configurations may correspond with two separate two 4-way systems within chassis 12a. The two separate 4-way system configuration allows for two separate and distinct computing systems within chassis 12a. The two separate 4-way system configuration requires two processing components 18 each having four processors 24, two I/O components 20, and two power supply components 22 for proper functionality with each processing component 18 acting independently. Another system configuration may be one single 8-way system within one chassis 12a. The one single 8-way system configuration allows for one single system within chassis 12a and requires two processing components 18 each having four processors 24, one I/O component 20, and two power supply components 22 for proper functionality where the eight processors 24 of the two processing components 18 work together as a single computing system.

A user may wish to create their own system configurations by modifying the pre-existing system configurations stored in storage medium 36 or creating entirely new system configurations. For instance, in the 8-way system configuration, a user may require both I/O components for proper functionality and therefore create a new system configuration by modifying the 8-way system configuration by requiring two I/O components 20 for proper functionality.

Referring to the configuration in FIG. 3a with an empty quadrant 14a, chassis 12a may or may not power up and function correctly depending on which system configuration the user selects. For example, if the user accesses management module 34 and selects the two separate 4-way system configuration allowing for chassis 12a to operate as two separate systems, when the user powers up chassis 12a processing component 18, I/O component 20a, and power supply component 22a will function correctly as a single 4-way computing system. Because there is not a processing component 18 in quadrant 14a, the requirements for the 4-way system configuration have not been met and I/O component 20b and power supply component 22b will not power up. Since the requirements of the two separate 4-way system configuration have not been fully met, management module 34 may give an indication that the requirements of the selected two separate 4-way system configuration have not been satisfied. Such indication may be a configuration warning letting the user or a system administrator know that the present modular component configuration does not completely satisfy the selected system configuration. The configuration warning allows the user or system administrator to understand that the reason why I/O component 20b and power supply component 22b are not functioning is not because there is an error or malfunction with I/O components 20b or power supply component 22b but because the modular component configuration is not in agreement with the selected system configuration.

Management module 34 may provide a configuration warning by flashing an LED or if chassis 12a or cabinet 11 is connected to an LCD monitor, the LCD monitor may display the configuration warning and give details about the configuration problem. In addition, management module 34 may also have a network or Ethernet connection back to a managed console so that the configuration warning may be automatically made to a system administrator alerting the system administrator that an invalid modular component configuration has been attempted. The system administrator may then contact the user to inform the user of the details of the incorrect modular component configuration.

If in the configuration of FIG. 3a the user selects the single 8-way system configuration, when the user attempts to power up chassis 12a, processing component 18 and I/O components 20a and 20b will not power up because the requirements of the single 8-way system configuration have not been satisfied. As stated above, the single 8-way system configuration requires two processing components 18 in quadrants 14a and 14b acting as a single 8-way computing system. Because quadrant 14a is empty and does not contain a processing component 18, chassis 12a cannot function under the single 8-way system configuration. Management module 34 recognizes that the current modular component configuration in chassis 12a does not satisfy the requirement of the selected system configuration and provides a configuration warning indicating that the modular component configuration does not satisfy the selected system configuration.

Figure 3B:
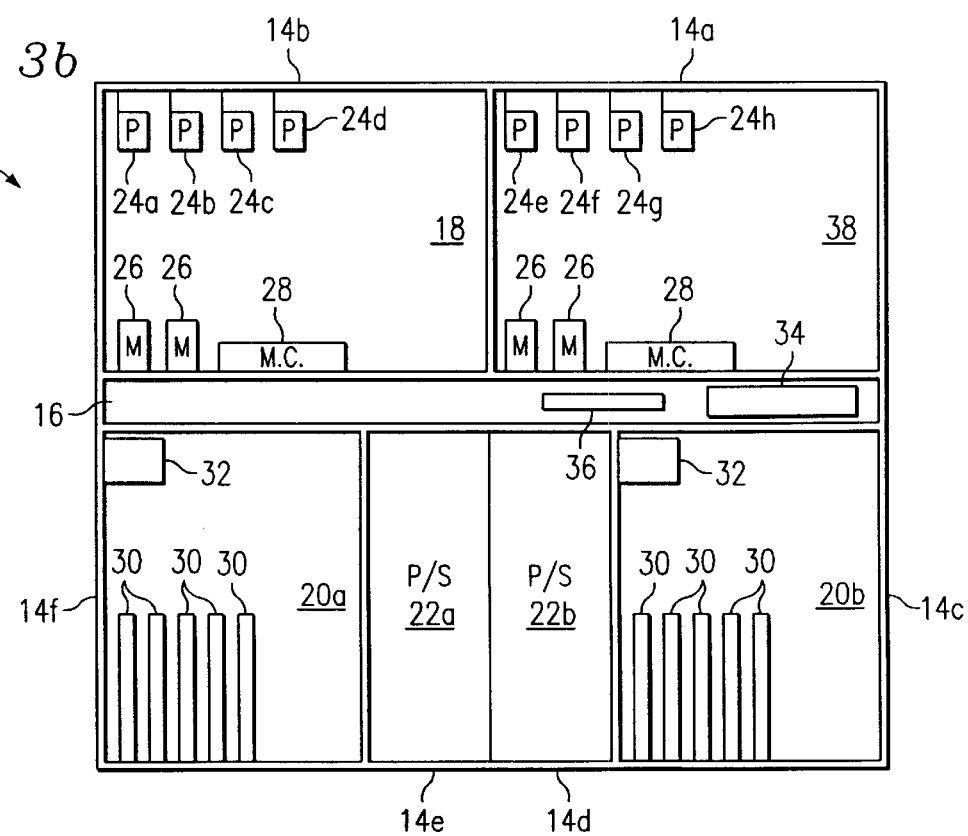

FIG. 3b depicts chassis 12b where the user has installed processing component 38 in quadrant 14a. Before the user installs processing component 38 into quadrant 14a, the user needs to select a system configuration that best fits with the user's reasons for installing processing component 38 into quadrant 14a. If the user desires chassis 12b to operate as two separate 4-way systems, then the user needs to select the 4-way system configuration before installing processing component 38 in quadrant 14a. If the user desires chassis 12b to operate as a single 8-way system, then the user needs to select the 8-way system configuration before installing processing component 38. The user may also desire a different modular component configuration than the 4-way or 8-way system configurations and would therefore need to select that system configuration from the system configurations stored in storage medium 36 or use management module 34 to create a new system configuration in accordance with the requirements of the user.

If the user desires two separate 4-way systems within chassis 12b, then the user selects the 4-way system configuration, installs processing component 38, and powers on chassis 12b. As chassis 12b powers on, management module 34 determines that the 4-way system configuration is the selected system configuration and checks storage medium 36 to see what the requirements are for the selected 4-way system configuration. Once management module 34 determines the requirements for the selected system configuration, management module 34 checks to see if the modular component configuration of chassis 12b satisfies the requirements of the selected 4-way system configuration. Management module 34 checks the modular component configuration to see if there are processing components 18 and 38 installed in quadrants 14a and 14b, I/O components 20 in quadrants 14c and 14f, and power supply components 22 installed in quadrants 14d and 14e. Management module 34 determines that the modular component configuration of chassis 12b in FIG. 3b satisfies the requirements of the selected 4-way system configuration and therefore continues the powering up of chassis 12.

In addition to applying to the modular component configuration within chassis 12b, the system configurations may also apply to the configurations or features within the individual modular components. For instance, with the modular component configuration in FIG. 3b the user selects a system configuration that results in chassis 12b operating as two separate systems where processing component 18, I/O component 20a and power supply component 22a operate as one system and processing component 38, I/O 20b, and power supply component 22b operate as one system. But one of the applications that the user runs on chassis 12b requires five processors and 3 GB of memory. The user is aware of the five processor and 3 GB requirement and therefore creates a new system configuration that creates two separate systems within chassis 12b where at least one of the two systems must contain five processors and 3 GB of memory. The user selects the new system configuration and when the user begins to power up chassis 12, management module 34 determines that the new system configuration is the selected system configuration. Management module 34 determines the requirements for the selected system configuration and checks not only the modular component configuration of chassis 12b but the configuration or features of processing components 18 and 38 to see if either processing component 18 or 38 contains five processors and 3 GB of memory. Since processing components 18 and 38 contain only four processors 24 each, the configuration or features of processing components 18 and 38 do not satisfy the selected system configuration and chassis 12b does not continue to power up. Management module 34 provides a configuration warning as described above to alert the user that the modular component configuration and the configuration or features of processing components 18 and 38 do not satisfy the selected system configuration.

Figure 3C:
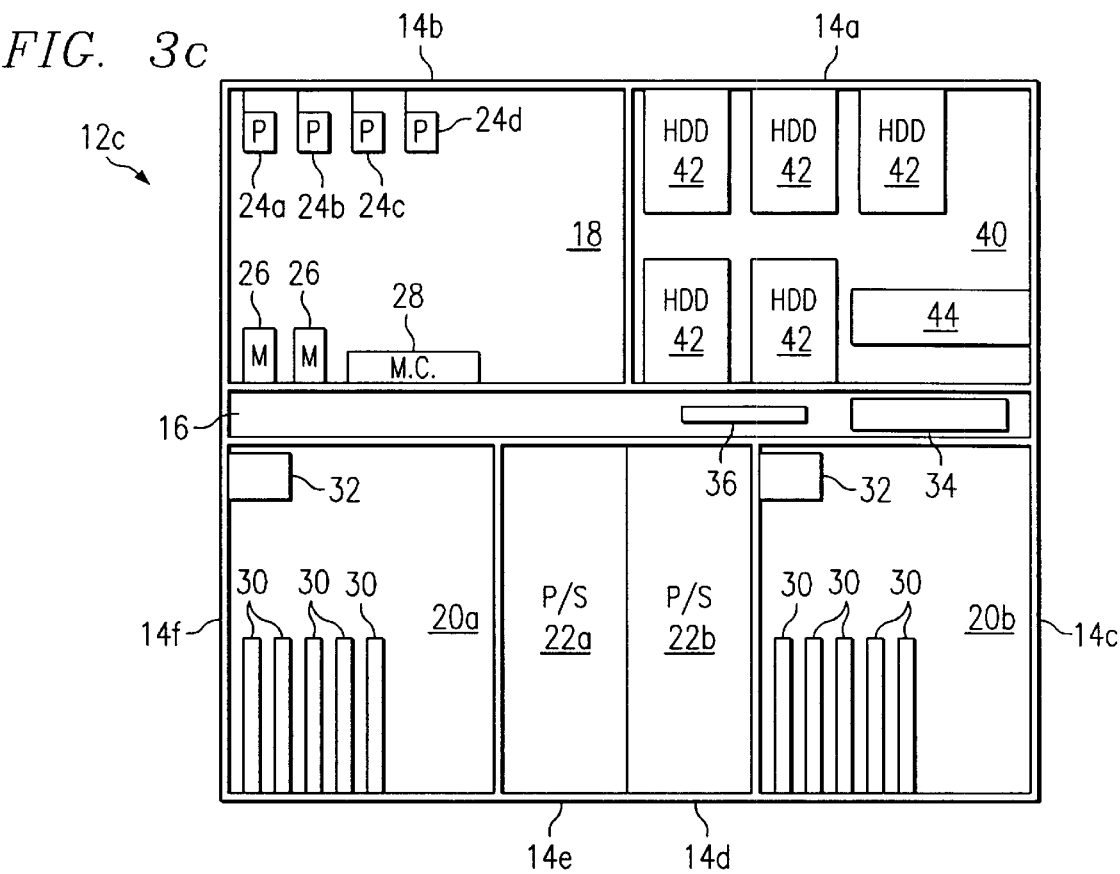
Figure 3D:
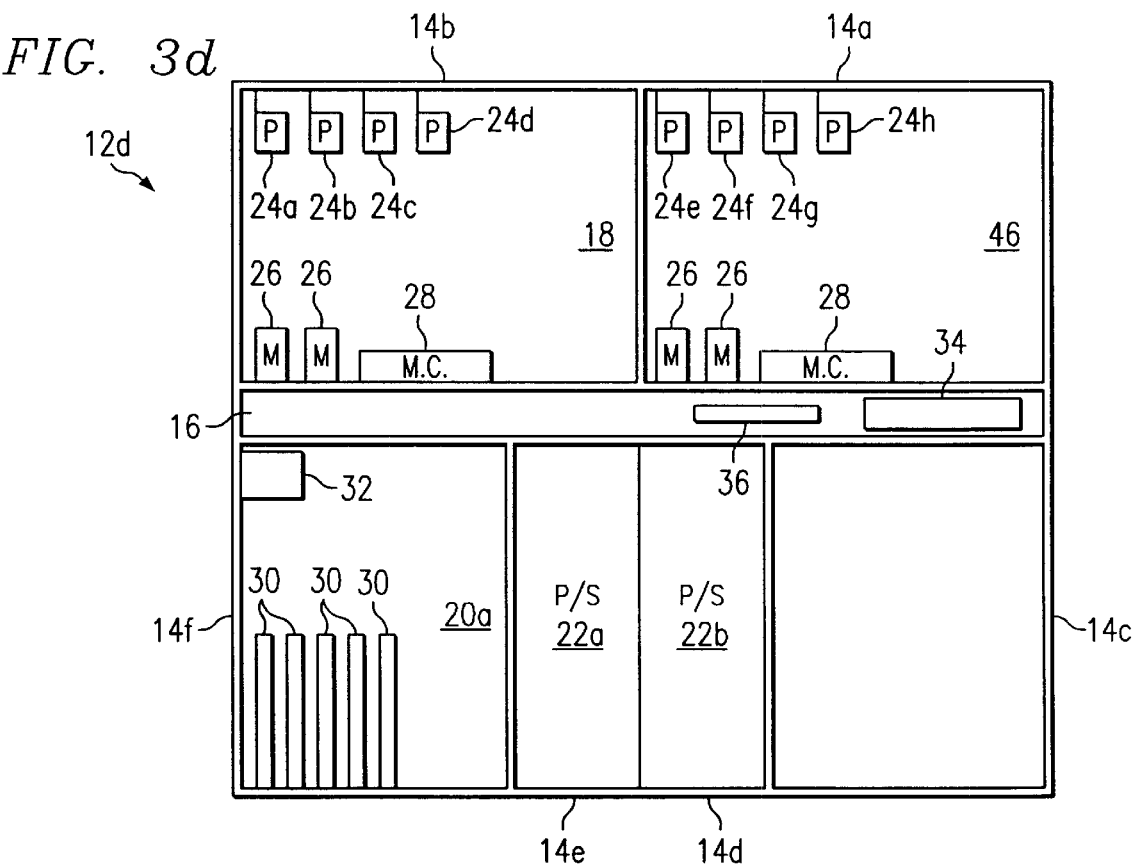

FIG. 3c depicts a block diagram of an alternate configuration for chassis 12c wherein data component 40 is installed in quadrant 14a. Data component 40 in FIG. 3c contains five hard disk drives 42 but in alternative embodiments, data component 40 may have more than five or less than five hard disk drives 42. Hard disk drives 42 store data and may be SCSI, EIDE, or any other appropriate hard disk drive type. In addition to the hard disk drives 42, data component 40 may also contain RAID controller 44 as well as support fibre channel and communicate with one or more just a bunch of disks (JBOD) enclosures.

When adding data component 40 to chassis 12c, the user needs to select a system configuration that takes into account the presence of data component 40. For example, before adding data component 40, the user may select a system configuration where chassis 12c operates as two separate systems—a processing computer system and a data computing system. Therefore, processing component 18, I/O component 20a, and power supply component 22a function together as a processing computing system and data component 40, I/O component 20b, and power supply 22b function together as a data computing system. Once the user makes the selection of the system configuration and powers on chassis 12c, management module 34 determines what the selected system configuration is and checks the modular component configuration of chassis 12c to see if the modular component configuration satisfies the requirements of the selected system configuration.

Management module 34 providing a configuration warning when the modular component configuration does not satisfy the selected system configuration makes servicing the modular computer system easier for both the users and service technicians. For instance, in the configuration of FIG. 3d, a user has already installed into chassis 12d processing component 18 in quadrant 14b, I/O component 20a in quadrant 14f, and power supply components 22a and 22b in quadrants 14d and 14e. The user selects a system configuration where quadrants 14b, 14f, and 14e function as one separate system and quadrants 14a, 14c, and 14d operate as another separate system. Therefore, the user is able to operate processing component 18, I/O component 20a and power supply component 22a as a separate and distinct system.

The user then acquires a new processing component 46 to install in quadrant 14a and installs processing component 46 in quadrant 14a but does not change the system configuration from two separate systems to a single system. Management module 34 requires quadrants 14a, 14c, and 14d to function as a separate system to satisfy the requirements of the selected system configuration creating two separate and distinct systems within chassis 12d. But in order for quadrants 14a, 14c, and 14d to function as a separate system, there must be an I/O component 20 installed in quadrant 14c which there is not within chassis 12d. Therefore when the user powers on chassis 12d, processing component 18, I/O component 20a, and power supply component 22a power on but processing component 46 does not power on. Management module 34 provides a configuration warning that the current modular component configuration does not satisfy the requirements of the selected system configuration. Because of the configuration warning, the user will know that processing component 46 not powering on is due to a problem with the modular component configuration and not a hardware problem with processing component 46. If there was no way to select and change system configurations and no configuration warning, the user would have no indication as to whether processing component 46 not powering up was due to processor component 46 being faulty or if a modular component configuration problem caused processing component 46 to not power up. And if the user contacts a service technician when processing component 46 does not power up, the service technician can easily tell if it is a modular component configuration or hardware problem by asking the user if the user received a configuration warning.

Chassis 12 may be configured in numerous ways to satisfy a variety of system configurations and are not limited to the modular component configurations shown in FIGS. 3a, 3b, 3c, and 3d. Users may decide to configure different chassis 12 with cabinet 11 with the same modular components allowing for large blocks of processing components, I/O components, data components, or power supply components. For example, the user may install only processing components 18 in chassis 12a, 12b, 12c, and 12d, only data components 40 in chassis 12e, 12f, 12g, and 12h, only I/O components 20 in chassis 12i, 12j, 12k, and 12l, and only power supply components 22 in chassis 12m and 12n. When the user configures cabinet 11 in this manner, the user needs to select or create a system configuration that is rack-centric instead of chassis-centric. Rack-centric system configurations allow management modules 34 for each chassis 12 to work together to determine if the modular component configuration of chassis 12 within cabinet 11 satisfies the selected rack-centric system configuration.

Figure 4:
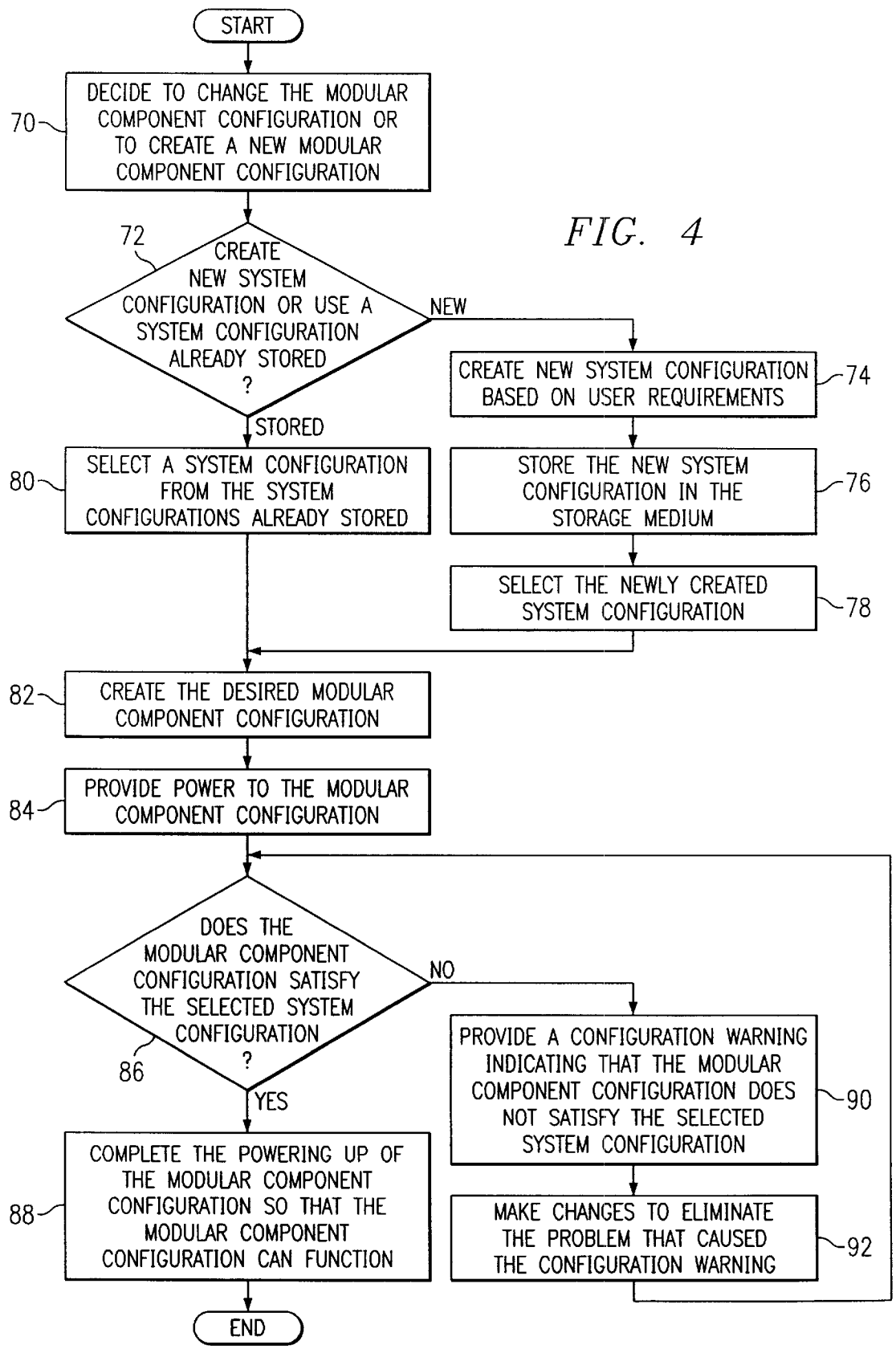
FIG. 4 depicts a flow diagram of a method for selecting system configurations and determining if the modular component configuration satisfies the selected system configuration.

FIG. 4 depicts a flow diagram of a method for selecting system configurations for modular component configurations of modular computer systems and determining if the modular component configuration satisfies the selected system configuration. The process begins at step 70 when the user decides to change or create a new modular component configuration within chassis 12. The user changes or creates a new modular component configuration by installing a new modular component, removing a modular component, or altering the arrangement of the modular components currently installed. At step 72, the user must decide to use a system configuration stored in storage medium 36 or to create a new system configuration. The user selects a system configuration already stored in storage medium 36 when such a system configuration corresponds with the modular component configuration of chassis 12 that the user decided upon at step 70. The user creates a new system configuration when there are not any system configurations already stored in storage medium 36 that correspond with the modular component configuration decided upon by the user at step 70. If the user needs to create a new system configuration, then at step 74 the user accesses management module 34 and creates the new system configuration in accordance with the requirements of the modular component configuration that the user desires to create within chassis 12. Management module 34 then stores the newly created system configuration in storage medium 36 at step 76 and the user selects the newly created system configuration at step 78 and the process continues to step 82.

If at step 72 the user decides to use a system configuration already stored in storage medium 36, then at step 80 the user selects the system configuration that best corresponds with the modular component configuration the user desires at step 70. At step 82, the user creates the desired modular component configuration within chassis 12 by installing additional modular components, removing existing modular components, or re-arranging or replacing the modular components within chassis 12. Once the user has created the desired modular component configuration within chassis 12, the user powers on chassis 12 at step 84.

As chassis 12 begins to power on, at step 86 management module 34 determines if the modular component configuration of chassis 12 satisfies the requirements of the selected system configuration. Management module 34 accesses storage medium 36 to determine what system configuration was selected by the user and to see what the requirements are for the selected system configuration. Management module 34 checks the requirements of the selected system configuration against the modular component configuration of chassis 12. If the modular component configuration satisfies the requirements of the selected system configuration, then at step 88 chassis 12 continues to power on allowing chassis 12 to function.

If at step 86 the modular component configuration does not satisfy the requirements of the selected system configuration, then at step 90 management module 34 provides a configuration warning to the user or a system administrator indicating that the current modular component configuration of chassis 12 does satisfy the requirements of the selected system configuration. The configuration warning allows the user to know that there is a problem with the modular component configuration and not a hardware problem with one of the modular components. Once management module 34 alerts the user that the modular component configuration does not satisfy the requirements of the selected system configuration, at step 92 the user needs to make the necessary changes to make the modular component configuration of chassis 12 satisfy the requirements of the selected system configuration. To make the modular component configuration and selected system configuration correspond, the user either needs to change the configuration of chassis 12 so that the configuration satisfies the requirements of the selected system configuration or select a different system configuration if the first selection of the system configuration was not actually what the user desired. Once the user has either changed the modular component configuration or selected a different system configuration, the process returns to step 86 where management module 34 determines if the modular component configuration satisfies the requirements of the selected system configuration and the process repeats depending on whether the modular component configuration satisfies the selected system configuration.

The process in FIG. 4 may be applied to all chassis 12 within cabinet 11 so that the modular component configuration of each chassis 12 is in accordance with the respected selected system configuration. In addition, the process of FIG. 4 may also be applied to the selection and use of rack-centric system configurations and rack-centric modular component configurations of cabinet 11 so that the modular component configuration of cabinet 11 satisfies the requirements of the selected system configuration.

Although the disclosed embodiments have been described in detail, it should be understood that various changes, substitutions and alterations can be made to the embodiments without departing from their spirit and scope.

What is claimed is:

1. A computer system comprising:

at least one modular component;

at least one system configuration operable to determine how the modular components interoperate with each other; and a management module associated with the system configurations, the management module operable to determine if a modular component configuration satisfies a selected system configuration and to give an indication of whether the modular component configuration satisfies the selected system configuration.

2. The system of claim 1 wherein the management module is further operable to provide as the indication a configuration warning when the modular component configuration does not satisfy the selected system configuration.

3. The system of claim 1 further comprising one or more multi-configurable chassis associated with the modular components, the multi-configurable chassis operable to house the modular components and including one or more quadrants.

4. The system of claim 3 wherein the system configurations are further operable to determine how the multi-configurable chassis interact with each other.

5. The system of claim 1 further comprising a storage medium associated with the management modules, the storage medium operable to store the system configurations.

6. The system of claim 5 wherein the management module accesses the selected system configuration in the storage medium to determine if the modular component configuration satisfies the selected system configuration.

7. The system of claim 1 wherein the system configurations comprise system configurations created by a user of the computer system based on one or more requirements of the user.

8. The system of claim 1 further comprising a midplane associated with the modular components, the midplane operable to receive the modular components.

9. A method for utilizing system configurations in a computer system including multiple modular components, the method comprising:

selecting a system configuration that corresponds to a modular component configuration;

creating the modular component configuration;

determining if the modular component configuration satisfies the selected system configuration; and indicating if the modular component configuration satisfies the selected system configuration.

10. The method of claim 9 further comprising creating one or more additional system configurations based on one or more requirements for a user of the computer system.

11. The method of claim 9 further comprising storing one or more system configurations in a storage medium.

12. The method of claim 11 wherein selecting a system configuration comprises accessing the storage medium for a system configurations.

13. The method of claim 9 wherein indicating if the modular component configuration satisfies the selected system configuration comprises providing a configuration warning when the modular component configuration does not satisfy the selected system configuration.

14. The method of claim 13 wherein providing a configuration warning comprises communicating one or more reasons why the modular component configuration does not satisfy the selected system configuration.

15. The method of claim 9 wherein determining if the modular component configuration satisfies the selected system configuration comprises determining if the modular components will operate in accordance with the selected system configuration after altering the modular component configuration.

16. The method of claim 9 further comprising creating system configurations corresponding with one or more features of particular modular components.

17. The method of claim 9 wherein determining if the modular component configuration satisfies the selected system configuration comprises determining if the modular components required by the selected system configuration are installed within a multi-configurable chassis.

18. A method for determining how multiple modular components within a computer system interact, the method comprising:

supplying power to a modular component configuration within one or more multi-configurable chassis;

determining if the modular component configuration satisfies a selected system configuration; and indicating if the modular component configuration satisfies the selected system configuration.

19. The method of claim 18 wherein indicating if the modular component configuration satisfies the selected system configuration comprises powering up the modular components when the modular component configuration satisfies the selected system configuration.

20. The method of claim 18 wherein indicating if the modular component configuration satisfies the selected system configuration comprises providing a configuration warning indicating one or more reasons why the modular component configuration does not satisfy the selected system configuration when the modular component configuration does not satisfy the selected system configuration.

21. The method of claim 18 wherein determining if the modular component configuration satisfies a selected system configuration comprises comparing the modular component configuration with one or more requirements of the selected system configuration.

\* \* \* \* \*